United States Patent [19]

Gardner

[11] Patent Number: 5,586,272
[45] Date of Patent: Dec. 17, 1996

[54] ASYNCHRONOUS DATA TRANSFERS AMONG A PLURALITY OF COMPUTER DEVICES

[75] Inventor: Edward A. Gardner, Colorado Springs, Colo.

[73] Assignee: Digital Equipment Corporation, Maynard, Mass.

[21] Appl. No.: 144,841

[22] Filed: Oct. 28, 1993

[51] Int. Cl.$^6$ ..................................................... C06F 13/00
[52] U.S. Cl. ............................................. 395/285; 395/286
[58] Field of Search .................................. 395/286, 285, 395/287, 290

[56] References Cited

U.S. PATENT DOCUMENTS 5,301,282  5/1994  Amini et al. ........................... 395/325
5,524,215  6/1996  Gay ....................................... 395/287

*Primary Examiner*—Jack B. Harvey
*Assistant Examiner*—David A. Wiley
*Attorney, Agent, or Firm*—Christine M. Kuta

[57] ABSTRACT

A method and apparatus for transferring data among a plurality of sending and receiving nodes is disclosed. All nodes use the same control lines in the same manner. In a first phase all nodes assert a first control line and transfer data to the data bus concurrent with the assertion of a second control line. After each of the nodes has released the first control line, a second phase occurs with all nodes reading the data. The data transfer is complete when a preconditioned second control line is released by all of the nodes. A third phase resets the control lines to enable the next data transfer cycle to begin. Nodes may take a variable time for each phase of a data transfer and the transfer rate is automatically adjusted to the slowest node.

9 Claims, 2 Drawing Sheets

ASYNCHRONOUS DATA TRANSFERS AMONG A PLURALITY OF COMPUTER DEVICES

FIELD OF INVENTION

This invention relates to data transfers among devices in a computer system and, more specifically, relates to a method and apparatus for performing asynchronous data transfers among any number of sending and receiving nodes.

BACKGROUND OF THE INVENTION

Modern computer systems often have many devices or nodes linked together by a common bus. These devices establish communication by one device being the sending node and a second device being the receiving node. Control lines and protocols enable the data transfer to occur over the common bus between the pair of devices.

Asynchronous data transfer systems in the prior art include the Unibus, SCSI, and FIPS channel. In these asynchronous systems, each device or node has a set of rules depending on its role and its role is based on its function. Thus a host processor is usually the master and a memory is a slave. After some prior arbitration, addressing and selection process, the master identifies a device with whom it will communicate. The master will assert a specific or dedicated control line and place the data on the common bus. The slave which has a separate control line then responds over the common bus. Release of both dedicated control lines means the data has been transferred. For a limited number of devices, this system is acceptable. However, as devices are added to or taken from the system, a number of lengthy processes must be performed to account for the changes in the system.

In yet another known prior art system for performing asynchronous data transfers, multiple sending nodes and/or multiple receiving nodes are contemplated. Each node has its own separate control line for sending and for receiving data. Obviously the more nodes in the system, the greater the number of control lines and the more complex the system becomes.

As systems become more flexible and devices have more intelligence and multiple functions, the need for multiple sending and/or receiving nodes in the computer system increases. What is needed is a generalized data transfer system. Ideally this system will be symmetrical and provide for a minimum of control signals while maximizing the throughput of the system.

SUMMARY OF THE INVENTION

It is an object of the invention to provide a simple data transfer mechanism for computer systems having a plurality of sending and/or receiving nodes.

It is a further object of this invention to provide a communications control protocol that minimizes the number of control lines and signals needed for data transfers and maximizes the throughput independent of the clock speed.

It is yet another object of the invention to provide a flexible, self configuring system which easily allows for the addition or deletion of nodes in the system.

It is a feature of the invention to provide a system which generalized two way communications so that a plurality of sending and receiving nodes may be involved.

Additional objects, features, and advantages of the invention will be set forth, in part, in the description which follows, and, in part, will be obvious from the description or may be learned from the practice of the invention.

To achieve the objects, features and advantages and in accordance with the purpose of the invention, a method and apparatus for performing asynchronous data transfer among multiple nodes is provided. In the first phase, any number of sending nodes may assert a first control line and then transfer data onto a data bus. Each of the sending nodes then asserts a second control line followed by the release of the first control line. Upon release of the first control line by all of the nodes in the system, the data is validated. In a second phase, the receiving nodes read the data from the data bus. Upon release of the second control line by all of the nodes in the system, the data transfer is complete. A third phase involving a third control line provides for the resetting of all the control lines so that another data transfer may occur.

In an alternative embodiment, a multiple number of data transfer occur consecutively. In this alternative embodiment six phases are utilized for three data transfers thus increasing the capacity for performing data transfers by fifty percent.

BRIEF DESCRIPTION OF THE DRAWINGS

This invention is pointed out with particularity in the appended claims. The above and further objects, features, and advantages of the invention may be better understood by referring to the following descriptions taken in conjunction with the accompanying drawings, in which:

DETAILED DESCRIPTION OF AN ILLUSTRATIVE EMBODIMENT

Figure 1:
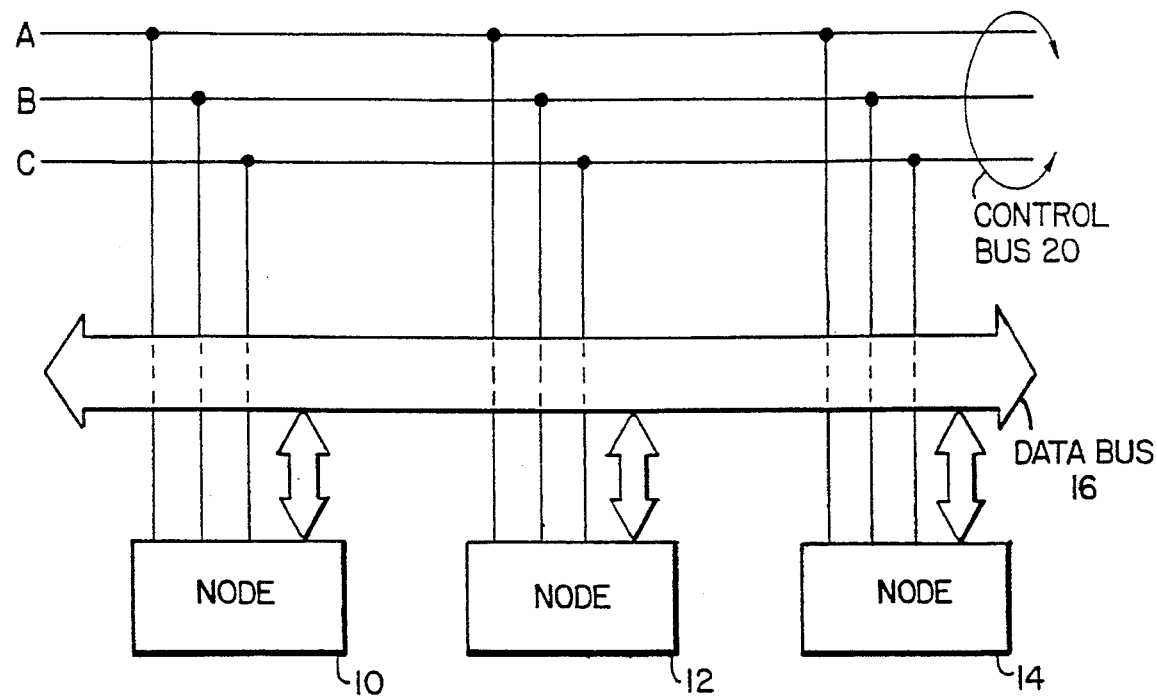
FIG. 1 is a block diagram of a system having a plurality of nodes for sending and receiving data according to the invention.

An embodiment of the present invention is shown in FIG. 1 in which a plurality of nodes 10,12 and 14 are shown connected to a common data bus 16. Although three nodes are shown connected to the data bus 16, it should be understood that a larger number of nodes are contemplated in the preferred embodiment. Nodes 10, 12 and 14 may be any device known in the art which has control logic, some intelligence and some buffering capability. Nodes can function as a sending node, a receiving node or both. Thus nodes may be host processors, I/O adapters, disks, tapes, laser printer interfaces, and a wide variety of known peripherals used in computer systems.

Nodes 10,12, 14 are connected in a computer system to data bus 16 which may have any number of data lines. Each data line transfers one bit of data per data transfer. Data bus 16 may also have a plurality of check lines. The check lines may carry check or error information for the data transferred over the data bus 16.

A data transfer over data bus 16 is controlled by the signals on the control bus 20. In the preferred embodiment of FIG. 1, data bus 16, along with control bus 20, forms an interlocked bus. An interlocked bus means that the sending and receiving nodes are locked together until the data transfer has been completed.

A control bus 20 is shown which comprises three control lines A, B and C. Each of the nodes 10,12,14 is coupled to each of the control lines A,B,C in a wired-or relationship. Each node 10,12,14 can assert and release signals over the control lines A,B,C. While many other implementations are possible, in the preferred embodiment of FIG. 1, the wired-or logic works such that when one node asserts a line, i.e. a low signal, the input for all the nodes for that control line is made low. When a control line is released, i.e. allowed to assume a high state, the input for all nodes will remain low if any other node is asserting a low signal. All node outputs to the control line must be released, i.e. high, in order for the input of the control line to become high. Thus when any one node asserts control line A, the control line will be asserted to all nodes. This wired-or relationship is commonly implemented with open collector drivers as is well known in the art. The wired-or configuration is a requirement for the control lines 20 and is a preferred implementation for the data bus 16.

Figure 2:
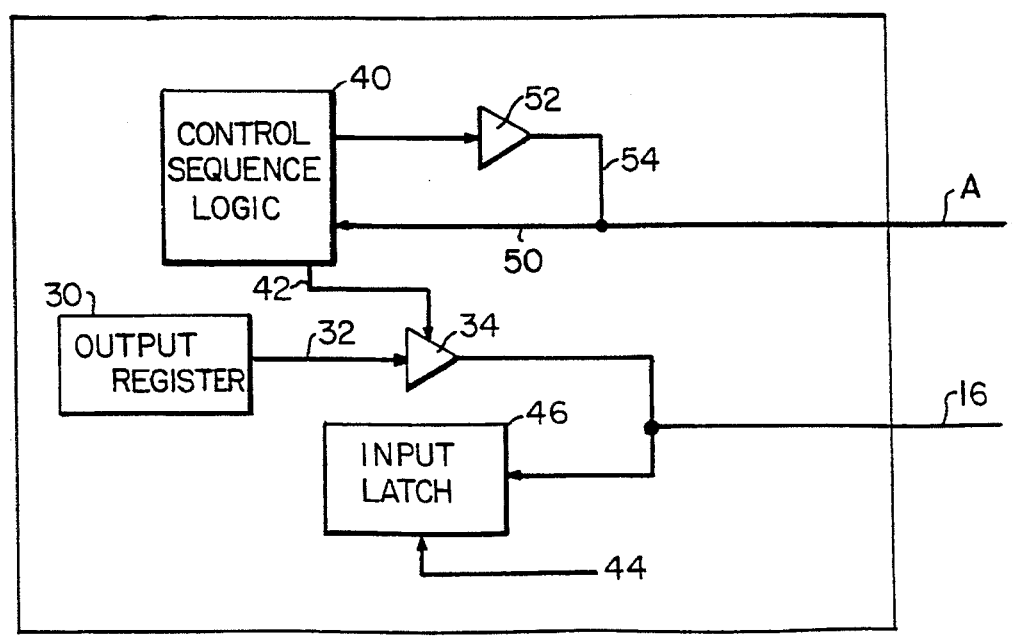
FIG. 2 is a block diagram of a node 10 within the system shown in FIG. 1.

FIG. 2 shows node 10 in greater detail. It is recognized that each of the nodes in the system will have a similar configuration as node 10. Output register 30 is any well known register and contains the data that node 10 wants to communicate to the other nodes in the system. If no data is to be transferred, then register 30 will contain all zeros or will be null. Output register 30 provides its data over line 32 to driver 34. Driver 34 is a well known device such as an open collector driver. When enabled by control sequence logic 40 via line 42, driver 34 transfers the data from register 30 to data bus 16.

Control sequence logic 40 is a standard state machine which controls the sequence of events for each node. As its first task, control sequence logic 40 asserts driver 52 which provides an asserted signal to control line A of control bus 20. The asserted signal and signals from all the other nodes on data bus 16 are returned via line 50 and sensed by the control logic 40. Control lines B and C are not shown in FIG. 2 but operate in the same fashion. As previously stated, control sequence logic 40 also provides a concurrent, enabling signal over line 42 which enables driver 34 to transfer the data from output register 30 to data bus 16. Finally, logic 40 provides an enabling signal over line 44 when the node 10 desires to read information. This signal enables input latch 46 to receive the data from data bus 16. Input latch is any standard device such as a flip flop which, in response to a control signal over line 44, stores information. Other logic (not shown) in the node will utilize this stored information. Thus the purpose of the control signals from logic 40 over lines 42 and 44 is to control when the data is put onto the data bus 16 or is read from the data bus 16.

Figure 3:
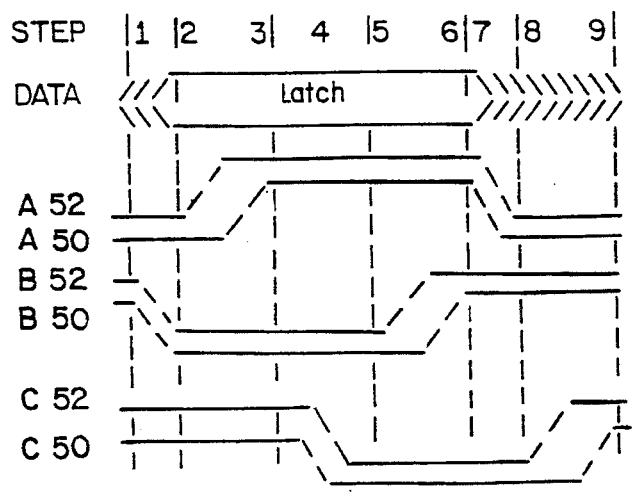
FIG. 3 is a timing diagram showing the state of the control lines A, B, C for one data transfer as provided by the system shown in FIG. 1.

FIG. 3 shows a data transfer cycle. This data transfer cycle comprises three phases and nine steps. The first phase, steps 1 through 3, is the transferring of data by the sending nodes onto the data bus 16. The second phase, steps 4 through 6, is the reading of data on the data bus 16 by the receiving nodes. The third phase, steps 7 through 9, is the resetting of the control lines 20 to begin a new data transfer cycle. For each control line A, B, C, FIG. 3 shows the enabling signal provided from control sequence logic 40 to driver 52 as A 52, B 52 and C 52, and the return signal from the control lines A, B, C via line 50 to the control sequence logic 40 as A 50, B 50, and C 50.

Throughout the description of the steps, the order of the events within each step is not important; thus while a sequence is described, it is recognized that it may be changed in actual operation. Each step, however, occurs in the order described.

Prior to step 1, all nodes have asserted control line A and all nodes have released control lines B and C. Thus control logic 40 has enabled driver 52 for control line A which provides a signal over line 54 to assert control line A. Control logic 40 has also disabled driver 52 for control lines B and C which leaves these control lines released.

Steps 1 through 3 comprise phase 1. Step 1 is the assertion of control line B and the enabling of data onto the data bus 16. Control logic 40 enables driver 52 for control line B, which provides a signal over line 54 to control line B. Control logic 40 also enables driver 34 to transfer data from output register 30 onto data bus 16. If node 10 has no data in register 30, then control logic 40 does not provide an enabling signal to driver 34 in the preferred embodiment. In an alternate embodiment, when node 10 has no data to output, control logic 40 would still enable driver 34 and output register 30 would contain zeros. This alternate embodiment requires driver 34 and data bus 16 to be implemented with wired-or drivers or an equivalent. It should be understood that within step 1, the assertion of control line B and the enabling of data onto the data bus 16 may occur in any order.

Step 2 involves the release of control line A by the node 10. Control logic 40 disables driver 52 for control line A, which provides a signal over line 54 to release control line A. This is shown in FIG. 3 as A 52. It should be understood that one node may perform step 2 before another node has completed step 1.

Step 3 involves waiting until control line A is released by all nodes. Control logic 40 waits until the signal over line 50 for control line A is observed to be released, i.e. becomes high. This is shown as A 50 in FIG. 3. This validates the data on data bus 16. Phase 1 of the data transfer concludes with the completion of step 3.

Steps 2 to 3 take into account the varying speeds and timing of each of the nodes in the system. Thus steps 2 to 3 provide for the synchronization of data assertion and control line B assertion for all the nodes. Based on this synchronization, the speed of the slowest sending node in the system which is participating in the data transfer determines the speed of the data transfer. If one of the nodes 10 stall, then a reset or timeout may need to be invoked.

It should be noted that each node works independently. Thus one node does not need to know when another node is transferring data. What matters is that each node after step 3 can determine that every other node has done steps 1 and 2. In particular at the conclusion of step 3, each node in the system knows that every other node has completed step 2. Moreover, since step 1 occurs before step 2, every node has transferred the data it desires to send to data bus 16.

Phase 2 entails the receiving of data from the data bus 16. After control line A becomes high validating the data on the data bus 16, each of the receiving nodes in the system will then read the data from the data bus 16. This entails the transfer of the data from data bus 16 to input latch 46. Control sequence logic 40 provides an enabling signal over line 44 which enables latch 46 to record the data. If the receiving node has no interest in reading the data from data bus 16, then control sequence logic need not send a signal over line 44 and the data will be ignored. Step 4 also involves the asserting of control signal C which is a preconditioning step to assure data transfer cycle synchronization.

Step 5 involves the release of control line B by the node 10 as shown by B 52. In step 6, each node waits for control line B to be released. When all the nodes have released control line B, step 6 is complete and the data transfer among all the nodes has been accomplished. Thus steps 5 to 6 show the synchronization of all the nodes in the system reading the data on the data bus 16. With the release of control line B, it is known that valid data has been recorded by all the receiving nodes and that all nodes have acknowledged that they were aware of the data transfer.

The third phase of the preferred embodiment is the resetting and restoring of all the control lines A, B, and C. More specifically, in step 7, sequence control logic 40 in each node reasserts control line A. Additionally, each node may release or alter the data bus during or after step 7. Step 8 involves the release of control line C by each of the nodes in the system. Step 9 involves waiting until control line C is observed to be released. Upon the release of control signal C in step 9, it is known that all nodes have asserted control line A and the next data transfer can occur. Without control line C, it would be possible to identify that a node or nodes asserted control line A, but it would not be possible to know that all nodes had asserted this signal. This is especially relevant for those systems having devices with significant varying speeds or response times. Thus, at the end of step 9, it is known that the system is back to its original state awaiting the start of the next data transfer.

From the above, it is clear that nodes may take whatever time they require for each step in a data transfer. Moreover, the data transfer rate automatically adjusts to the slowest mode. The invention contemplates that a node may be both a sending and receiving node and each node's use of the control lines is identical whether sending or receiving, a situation not yet addressed by the prior art. FIG. 3 is a self stabilizing system. If any data or control error or improper sequencing occurs, within one cycle, the system will stabilize and all further data transfers will be able to proceed.

Figure 4:
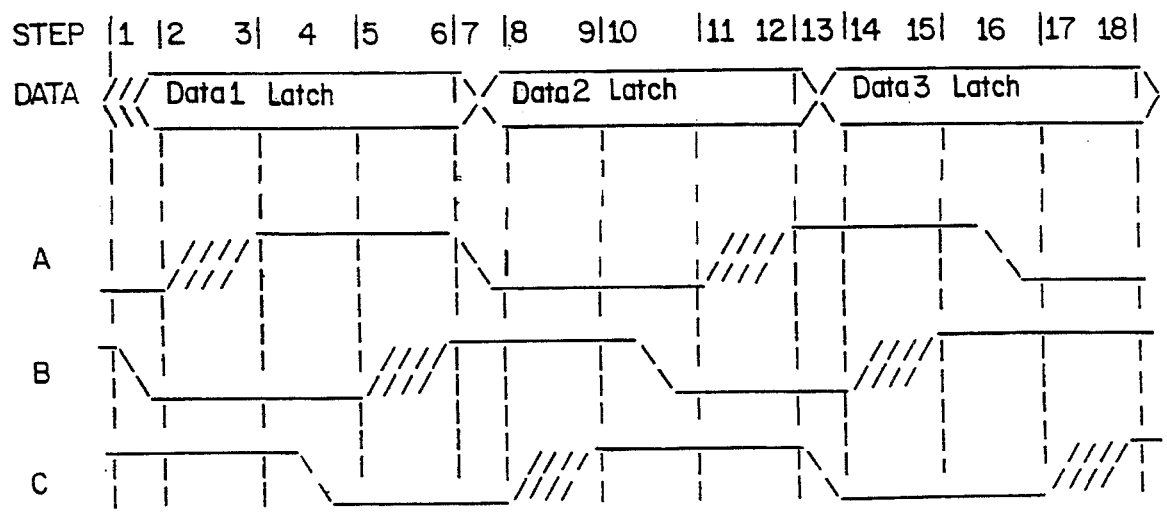
FIG. 4 is a timing diagram of an alternative embodiment of the present invention showing multiple data transfers.

FIG. 4 shows an alternative embodiment of the present invention which involves three data transfers in six phases. Relative to FIG. 3, FIG. 4 shows the separate control line output and input signals (e.g. A 52 and A 50) as one signal. The multiple transitions shown as each control line is released are used to indicate that each node in turn releases its control line output, followed by the control line input for all nodes being released when the last node releases its control line output. This is merely a more compact representation of the same operation.

The alternative embodiment shown in FIG. 4 is useful for those situations requiring a higher data transfer rate. Control sequence logic 40 needs to maintain track of the data transfers from the beginning of step 1 so that it can properly interpret the control sequences that occur during the data transfers; thus FIG. 4 is unlike FIG. 3 in that no self stabilizing feature exists. As is apparent from a view of FIG. 4, with three data transfers in six phases, data transfers with this embodiment are fifty percent faster than data transfers using the preferred embodiment in FIG. 3. Moreover, for the higher transfer rate, rather than each combination of control line signals having a definitive meaning, the sequence of control line combinations since the beginning of the transfer is important. Control logic 40 must be responsive to the sequence and combination of control signals over control bus 20 starting with step 1.

FIG. 4 shows the same first six steps as FIG. 3. These steps comprise the first data transfer as depicted by the data1 latch line in FIG. 4. However, in FIG. 4, step 7 begins a new data transfer. In step 7, control line A is asserted and data from the sending nodes are placed onto data bus 16. In steps 8–9, each node releases control signal C, then waits until control line C is observed as released. For this alternative embodiment, the release indicates that the nodes have completed the transfer of data to data bus 16. The release of control signal C by all the nodes in steps 8–9 means that the new data transferred to data bus 16 has been validated.

Step 10 involves the reading of the data on data bus 16. This occurs subsequent to the data being validated by control line C. Step 10 also involves the assertion of control line B. This is a preconditioning step to enable later synchronization.

Steps 11 to 12 cover the release of control line A by all the nodes in the system. This marks the completion of the second data transfer and is shown as data2 latch in FIG. 4. As opposed to FIG. 3 where the release of all control lines B indicated the completion of the data transfer, control logic 40 is now functioning to acknowledge the completion of the data transfer by the release of control line A.

Step 13 involves the transfer of the third set of data to the data bus 16. It also requires all nodes to assert control line C. The release of signals over control line B in steps 14 to 15 means that the data has been placed on data bus 16 by all the sending nodes and, upon completion of step 15, the data is validated.

Step 16 involves the reading of the data on data bus 16 and the assertion of control line A. In like manner steps 17 to 18 involve the release of control line C and the completion of the third data transfer as shown by data3 latch in FIG. 4.

As is apparent from the above, all nodes use the same control lines in the same manner thus avoiding any need for configuration settings or knowledge. No special control lines, as is the case for a master/slave exchange, are provided. Moreover, any node may send or receive data and may switch roles at any time. Each node perceives a signal as asserted if at least one node is asserting that signal and perceives a signal as released if all the nodes have released the signal.

There are two other situation which may be accounted for by the control logic 40. In the first situation all the control lines are released. This could, for example, mean that the system is currently initialized but that no device is ready to send data over the data bus. The second situation involves the assertion of all three control lines at once. This may, for example, establish an initialization sequence for the nodes in the system to start a data transfer or, alternatively, it may indicate a reset condition and force abandonment of the current data transfer. This situation may occur when one of the sending and/or receiving nodes becomes hung.

Another augmentation of the present invention may involve the use of a separate set of check lines used to detect errors on a set of data lines. In a preferred implementation, the check lines will encode in binary the number of zero bits that are provided on the data lines. Since each node works independently on the system, by providing complementary check bits one can ensure that correct data has been sent.

For example, in the simplest situation, the data line and the check line are made complementary. In this example, one line will always be asserted. Thus if one data line has a binary one, the check line would be a binary zero; conversely, if the data line were a binary zero, the check line would indicate that one binary zero was being transferred and thus be a binary one. This scheme can be extended to multiple data lines, for example, three data lines and two check lines encoding in binary whether the data lines have 0, 1, 2, or 3 bits that are zero.

An advantage of this coding means that it is possible to tell when the transmission has been completed since all the lines will be released. In addition, the error detection capability is utilized since the receiving node can compare the data received against the check line(s). If there has been a change, the node knows that the data has not been correctly transferred.

Finally, this encoding scheme ensures that the sending nodes are sending the same data since if there is different data being sent by two or more of the sending nodes, the receiving nodes will detect the change in asserted patterns and void the data transfer.

As is apparent from the above, many variations and uses of the invention may be made. Special adaptations may be made involving fewer or more than the three control lines while remaining within the spirit of the invention. It is apparent that the duration of every event is indicated by explicit signals rather than being determined by time as would be the situation for synchronous signals.

Other modifications and variations may be made to the invention. A principal variation of the invention would be the assigning of a bus identification automatically in a multinode environment. It is the object of the appended claims to cover all such variations and modifications as come within the spirit and scope of the invention.

What is claimed as new and desired to be secured by Letters Patent of the United States is:

1. The method of transferring data asynchronously among a plurality of node, each node capable of sending and/or receiving data, the method comprising the steps of:

(a) asserting a first control line by a plurality of nodes, (b) sending data to a data bus by said plurality of nodes, (c) asserting a second control line by said plurality of nodes, (d) synchronizing each of said plurality of nodes by the release of all signals on a first control line, (e) reading said data by said plurality of nodes from said data bus subsequent to said synchronizing step, and (f) releasing said second control line by all of said plurality of nodes resulting in the completion of said data transfer to said plurality of nodes.

2. The method as defined in claim 1 wherein said sending step comprises:

releasing a first control line by each of said plurality of nodes sending said data, waiting for all of said plurality of nodes to release said first control line resulting in the data on the data bus being validated.

3. The method as defined in claim 2 wherein said reading step comprises:

releasinging a second control line by each of said plurality of nodes reading said data, waiting for all of said plurality of nodes to release said second control line resulting in the data transfer being completed.

4. The method as defined in claim 3 and further comprising the steps of:

asserting a third control line subsequent to said synchronizing of said plurality of nodes, and releasing said third control lines by all of said plurality of nodes.

5. The method as defined in claim 4 wherein said releasing of third control lines enables an additional data transfer to be validated.

6. An apparatus for transferring data comprising:

a data bus, a plurality of control lines, and a plurality of nodes coupled to said data bus and said plurality of control lines for sending and/or receiving data over said data bus, and wherein each of said plurality of nodes provides an enabling and/or disabling signal to the same control line of said plurality of control lines, a first control line of said plurality of control lines controls the sending of data to said data bus when an enabling signal is received from said plurality of nodes, and a second control line of said plurality of control lines controls the reading of data from said data bus when an enabling signal is detected on said second control line and a disabling signal from all of said nodes on said first control line has been made.

7. An apparatus as defined in claim 6 wherein said each node comprises:

data source means for storing said data from said each node, sequence means coupled to said data source means for enabling said data source means to send data to said data bus, and latch means coupled to said sequence means for receiving data from said data bus in response to an enabling signal from said sequencing means.

8. An apparatus as defined in claim 7 wherein each of said plurality of nodes is wired-or to each of said plurality of control lines.

9. An apparatus as defined in claim 8 wherein said each node is coupled to a third control line of said plurality of control lines, said sequencing means providing an enabling and disabling signal from said each node to said first, second and third control lines, the disabling signal from all of said plurality of nodes on one of said plurality of control lines resulting in synchronization of a data transfer operation.

* * * * *